United States Patent
Baliga et al.

(10) Patent No.: US 8,572,573 B2
(45) Date of Patent: Oct. 29, 2013

(54) METHODS AND APPARATUS FOR INTERACTIVE DEBUGGING ON A NON-PREEMPTIBLE GRAPHICS PROCESSING UNIT

(75) Inventors: Avinash Bantval Baliga, Austin, TX (US); Gregory Paul Smith, Leander, TX (US)

(73) Assignee: Nvidia Corporation, Santa Clara, CA (US)

(*) Notice: Subject to any disclaimer, the term of this patent is extended or adjusted under 35 U.S.C. 154(b) by 46 days.

(21) Appl. No.: 13/417,019

(22) Filed: Mar. 9, 2012

(65) Prior Publication Data

US 2013/0238938 A1  Sep. 12, 2013

(51) Int. Cl.
G06F 9/44 (2006.01)

(52) U.S. Cl.
USPC ........... 717/125; 717/124; 717/126; 717/129; 714/38.1; 712/244

(58) Field of Classification Search
None
See application file for complete search history.

(56) References Cited

U.S. PATENT DOCUMENTS

| | | | |
|---|---|---|---|
| 5,255,385 A * | 10/1993 | Kikuchi | 714/25 |
| 5,361,352 A * | 11/1994 | Iwasawa et al. | 717/124 |
| 5,371,746 A * | 12/1994 | Yamashita et al. | 714/38.12 |
| 5,799,142 A * | 8/1998 | Toyoda | 714/38.1 |
| 5,805,890 A * | 9/1998 | Simons et al. | 717/124 |
| 5,862,381 A * | 1/1999 | Advani et al. | 717/125 |
| 5,950,003 A * | 9/1999 | Kaneshiro et al. | 717/130 |
| 6,014,514 A * | 1/2000 | Sistare | 717/125 |
| 6,223,338 B1 * | 4/2001 | Smolders | 717/128 |
| 2002/0199173 A1 * | 12/2002 | Bowen | 717/129 |
| 2006/0242627 A1 * | 10/2006 | Wygodny et al. | 717/128 |
| 2007/0168968 A1 * | 7/2007 | Bates et al. | 717/124 |
| 2010/0088683 A1 * | 4/2010 | Golender et al. | 717/128 |
| 2012/0066378 A1 * | 3/2012 | Lui et al. | 709/224 |
| 2012/0226837 A1 * | 9/2012 | Cruickshank et al. | 710/110 |

OTHER PUBLICATIONS

Title: On-the-Fly Visualization and Debugging of Parallel Programs, author: Ming C. Hao et al, source: IEEE, dated: 1994.*
Title: VIDA: Visual interactive debugging, author: Dan Hao et al, source: IEEE, dated: 2009.*

* cited by examiner

Primary Examiner — Chameli Das
(74) Attorney, Agent, or Firm — Patterson & Sheridan, L.L.P.

(57) ABSTRACT

Systems and methods are disclosed for performing interactive debugging of shader programs using a non-preemptible graphics processing unit (GPU). An iterative process is employed to repeatedly re-launch a workload for processing by the shader program on the GPU. When the GPU encounters a hardware stop event, such as by reaching a breakpoint in any thread of the shader program, encountering a hardware exception, or failing a software assertion in the shader program, the state of any executing threads is saved, graphics memory is copied to system memory, and any currently executing threads are killed to enable the GPU to process graphics data for updating a display device. Each pass of the workload may result in incrementally more data being processed. In effect, the changing state and variable data resulting from each pass of the workload has the effect that the debugger is incrementally stepping through the shader program.

20 Claims, 8 Drawing Sheets

METHODS AND APPARATUS FOR INTERACTIVE DEBUGGING ON A NON-PREEMPTIBLE GRAPHICS PROCESSING UNIT

BACKGROUND

1. Technical Field

The present disclosure generally relates to debugging, and more specifically to methods and apparatus for interactive debugging on a non-preemptible graphics processing unit (GPU).

2. Description of the Related Art

Conventional debugging tools provide the capability to halt execution of a program at a given point in the program and evaluate the processor context (i.e., memory, registers, etc.) at that point in the program using a user interface of some type, typically a graphical user interface displayed on a monitor coupled to the debugging platform. Typically, debugging tools are categorized as software implementations or hardware implementations.

Software debugging includes many techniques for detecting errors in a program. One technique for debugging a program is to modify the program so that various variable values are written to an alternate location or replace the normal program output during execution of the program. The program is then re-executed to collect the desired output. While such techniques may be beneficial for detecting some types of errors, these techniques have many disadvantages. Requiring a user to execute a modified program may not allow a user to analyze the program in real-time. If the program is not deterministic, then re-executing the program may display inconsistent values for variables. In addition, only trusted parties that have access to the program's source code may perform debugging operations. Further, re-executing the program may require large memory transfers in order to reset state variables, which may introduce additional delays or inconsistencies. Modifying the program may also hide some errors caused by the specific timing of instructions as executed by the system or change the order of the instruction stream generated by the compiler, thereby leading to entirely different results. Further, a user may not be able to analyze the efficiency of the unmodified program to determine where some types of processing bottlenecks are occurring. Another technique based on software debugging implementations may utilize a software emulator to simulate the execution of a program on a targeted platform. The software emulator allows the user to step through instructions and understand the effects of those instructions on a processor context of the targeted platform. However, because the software emulator merely simulates the targeted platform, debugging certain transient errors caused by asynchronous execution of instructions may be difficult using the software emulator. Furthermore, the software emulator may behave differently than the targeted hardware platform due to bugs inherent in the software emulator or tradeoffs between simulation performance and accuracy, thus confounding the debugging issue.

In addition to software debugging tools, many hardware platforms implement various hardware debugging tools that may be used in lieu of or in addition to software debugging techniques. For example, some processors enable hardware breakpoints to be implemented by a debugger that halts the execution of the program on the processor when a specific instruction is executed and waits for a resume command to be issued. Other processors implement some type of debugging port such as a JTAG (Joint Test Action Group) port that enables access to internal debug modules implemented on the integrated circuit of the target platform.

Conventionally, debugging may be implemented via software emulators or via remote debugging that requires a targeted platform connected to a computer that is executing the debugger. One reason for implementing debugging on a target platform that is separate from a development platform is that halting execution of a source program executing on the same platform of the debugger may also halt critical hardware needed to run the debugger. For example, utilizing a breakpoint on a CPU executing a source program may prevent the CPU from running the operating system, thereby preventing the programmer from viewing the state of the CPU or making changes to memory using the software debugging tools.

Accordingly, what is needed in the art is a system and method that allows for interactive debugging of a target GPU while also allowing the target GPU to continue normal screen drawing operations received from the operating system.

SUMMARY OF THE INVENTION

One example embodiment of the disclosure sets forth a method for performing interactive debugging on non-preemptible graphics processing units. The method includes the steps of causing a shader program to be loaded onto a parallel processing unit, where the parallel processing unit is configured to render a graphical user interface for an interactive debugging environment for display on a display device coupled to the parallel processing unit, and issuing a workload to the parallel processing unit for processing during a first pass, where the workload is processed by a plurality of threads executing in parallel on separate input data included in the workload, and wherein the parallel processing unit is configured to halt processing of the workload when a hardware trap is triggered by any thread in the plurality of threads. The method further includes the steps of detecting that a hardware trap has occurred during a first point in the processing of the workload and entering a re-launch loop that comprises disabling processing of the workload to allow the graphical user interface to be updated by the parallel processing unit and re-issuing the workload to the parallel processing unit for processing during one or more subsequent passes.

Another example embodiment of the disclosure sets forth a computer-readable storage medium including a debugger configured to perform the steps of the method set forth above. Yet another example embodiment of the disclosure sets forth a system configured to perform interactive debugging on non-preemptible graphics processing units.

One advantage of the disclosed approach is that a computer used for debugging purposes may use a single GPU for both hardware debugging and screen updates. Other advantages include the ability to debug non-deterministic applications and the ability to debug programs for which no source code is available.

BRIEF DESCRIPTION OF THE DRAWINGS

So that the manner in which the above recited features of the present disclosure can be understood in detail, a more particular description, briefly summarized above, may be had by reference to example embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the invention may be practiced without one or more of these specific details.

System Overview

Figure 1:
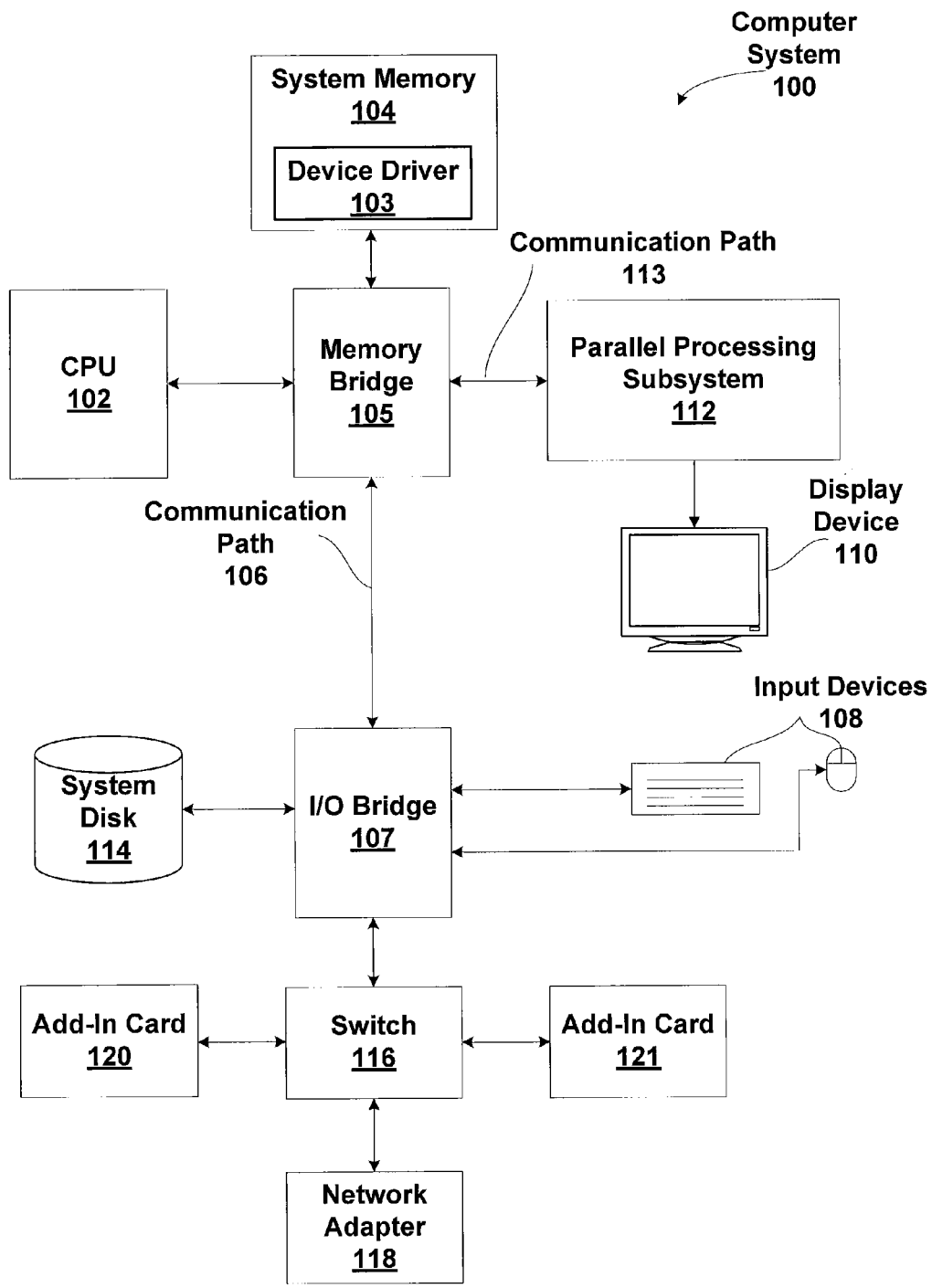
FIG. 1 is a block diagram illustrating a computer system configured to implement one or more aspects of the present disclosure.

FIG. 1 is a block diagram illustrating a computer system 100 configured to implement one or more aspects of the present disclosure. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
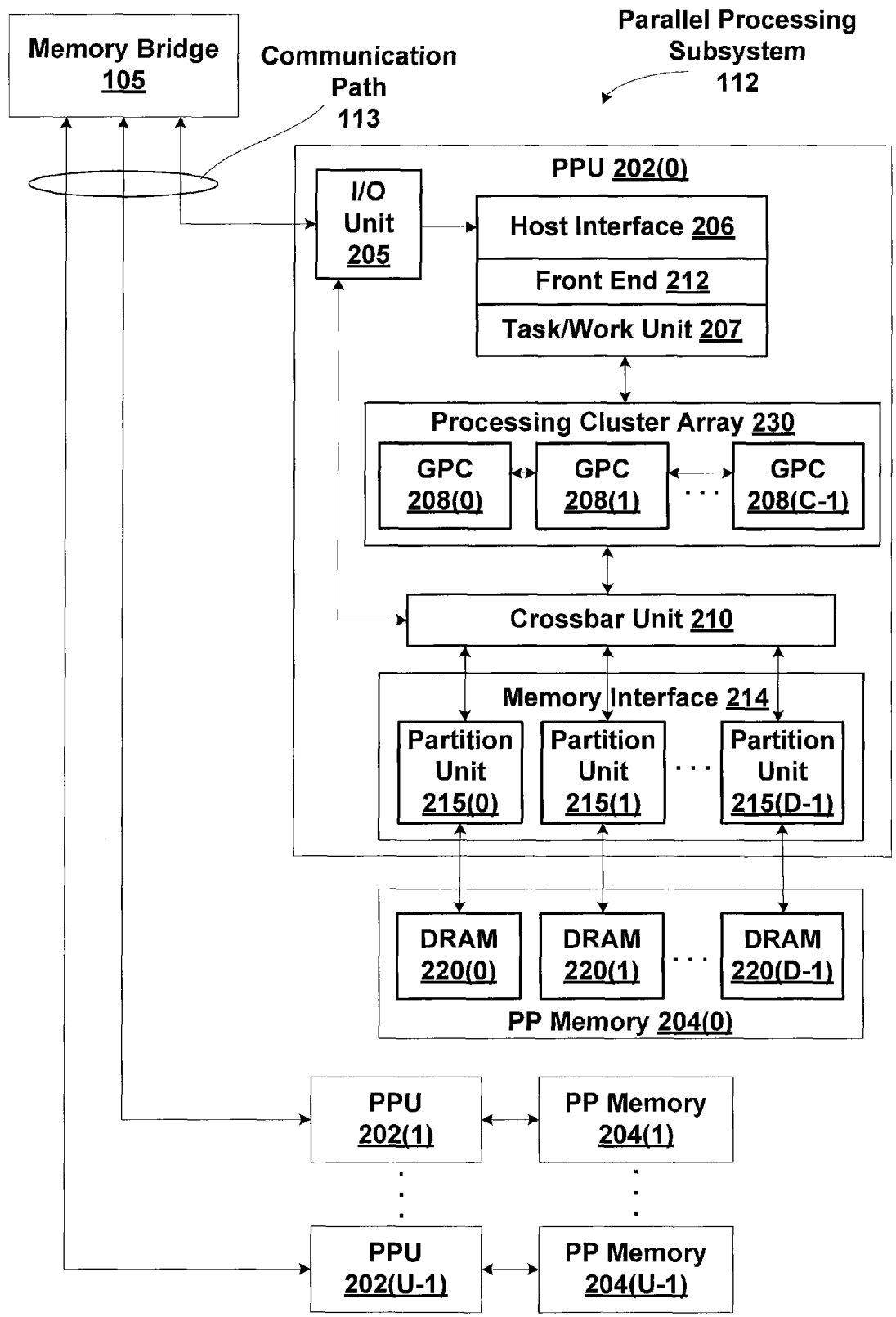
FIG. 2 is a block diagram of a parallel processing subsystem for the computer system of FIG. 1, according to one example embodiment of the present disclosure.

FIG. 2 illustrates a parallel processing subsystem 112, according to one example embodiment of the present disclosure. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s)

or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
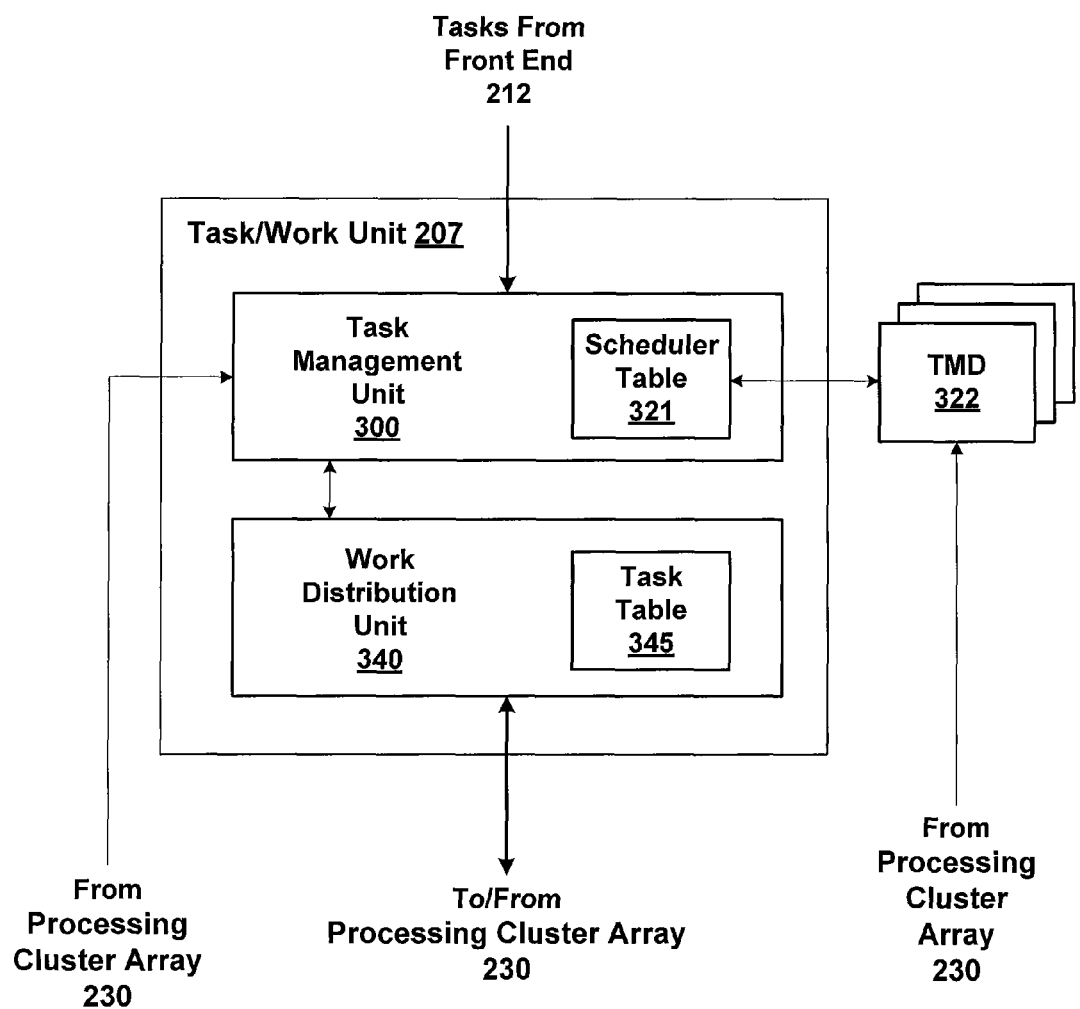
FIG. 3A is a block diagram of the front end of FIG. 2, according to one example embodiment of the present disclosure.

FIG. 3A is a block diagram of the task/work unit 207 of FIG. 2, according to one embodiment of the present disclosure. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
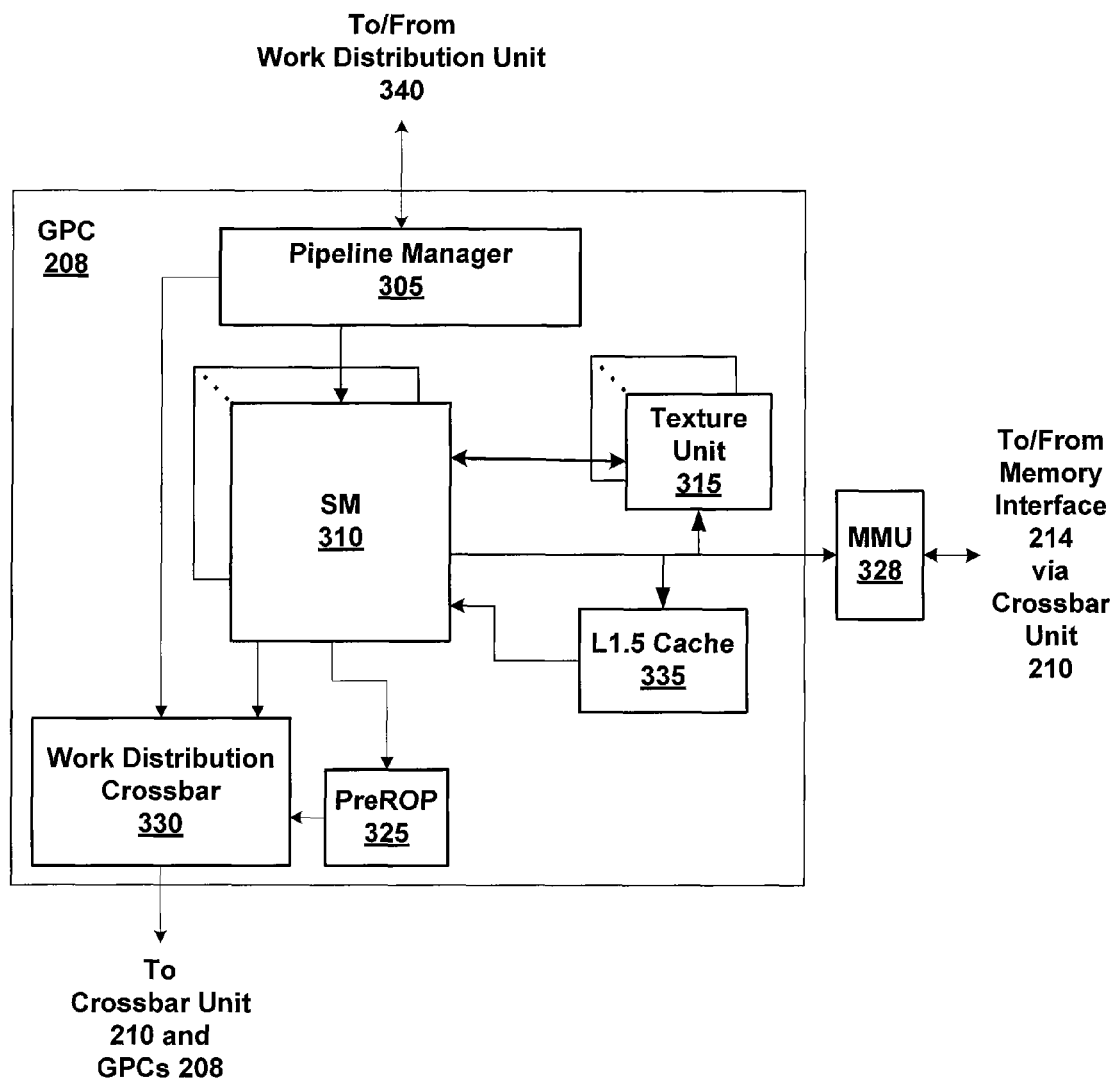
FIG. 3B is a block diagram of a general processing cluster within one of the parallel processing units of FIG. 2, according to one example embodiment of the present disclosure.

FIG. 3B is a block diagram of a GPC 208 within one of the PPUs 202 of FIG. 2, according to one example embodiment of the present disclosure. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
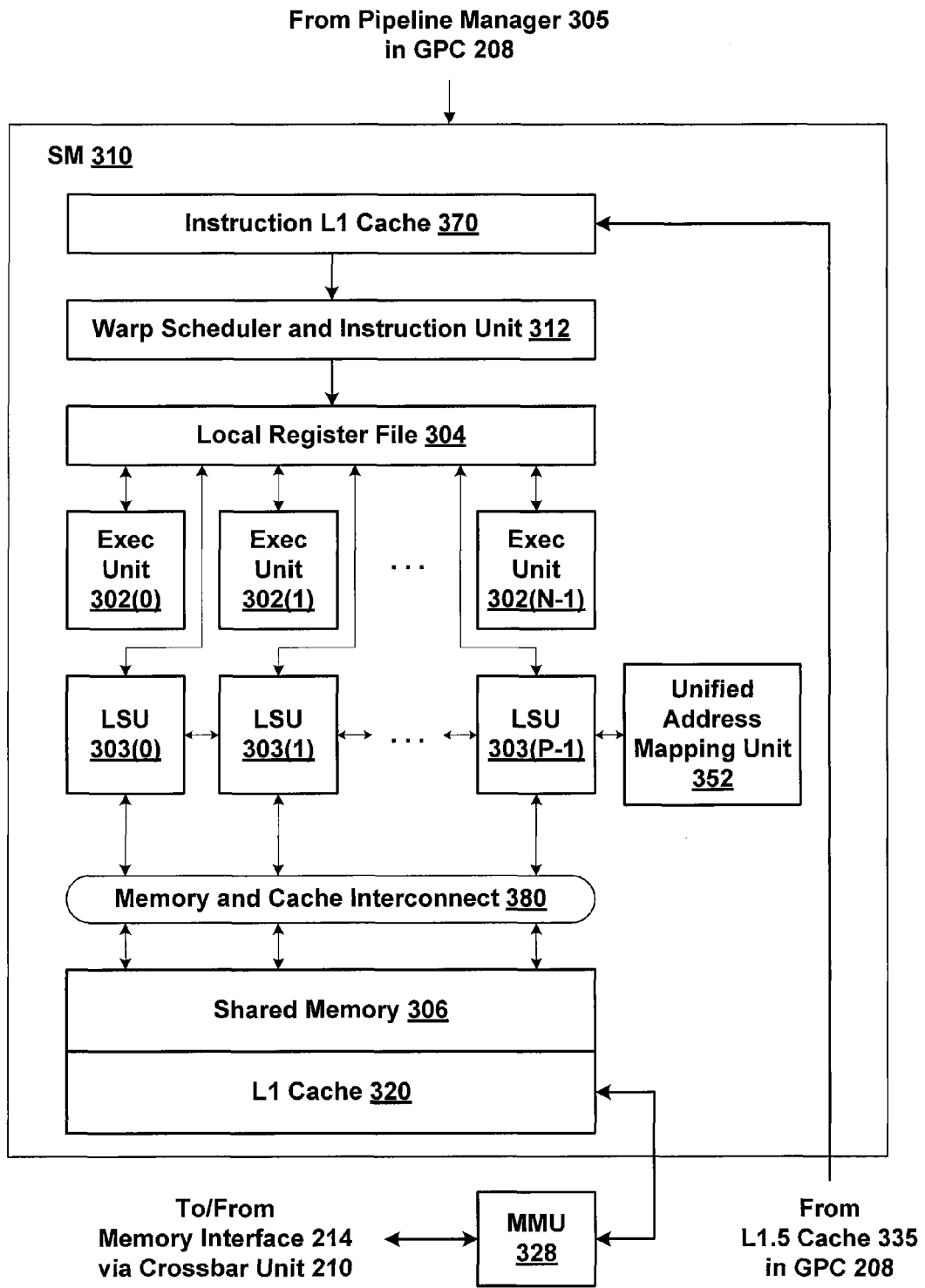
FIG. 3C is a block diagram of a portion of the streaming multiprocessor of FIG. 3B, according to one example embodiment of the present disclosure.

FIG. 3C is a block diagram of the SM 310 of FIG. 3B, according to one example embodiment of the present disclosure. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CIA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each entry in a linked list stores a task pointer to a TMD 322 in memory and a pointer to the next entry in the respective linked list. A head pointer and a tail pointer for the linked list are stored for each TMD group. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD 322 corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more push buffers output by the host interface 206 at a faster rate than the compute tasks may be output for execution by the work distribution unit 340. The input from the different push buffers are independent streams, typically generated by the same application program in order to have multiple sets of dependent tasks, but in some embodiments, multiple application programs can write to the pushbuffers. The task management unit 300 may be configured to buffer the compute tasks in the scheduler table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the TMD group in which the selected compute task is stored. Regardless of the scheduling technique, the task management unit 300 is able to quickly select a compute task by selecting the first entry in the linked list of the appropriate group. The task management unit 300 may easily organize, and, if needed, reorder the compute tasks by simply changing the ordering of the task pointers in the linked lists of the TMD groups. Therefore, the compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority TMD group that has at least one compute task, starting at the head of the group.

Interactive Debugging with a Non-Preemptible GPU

Figure 4:
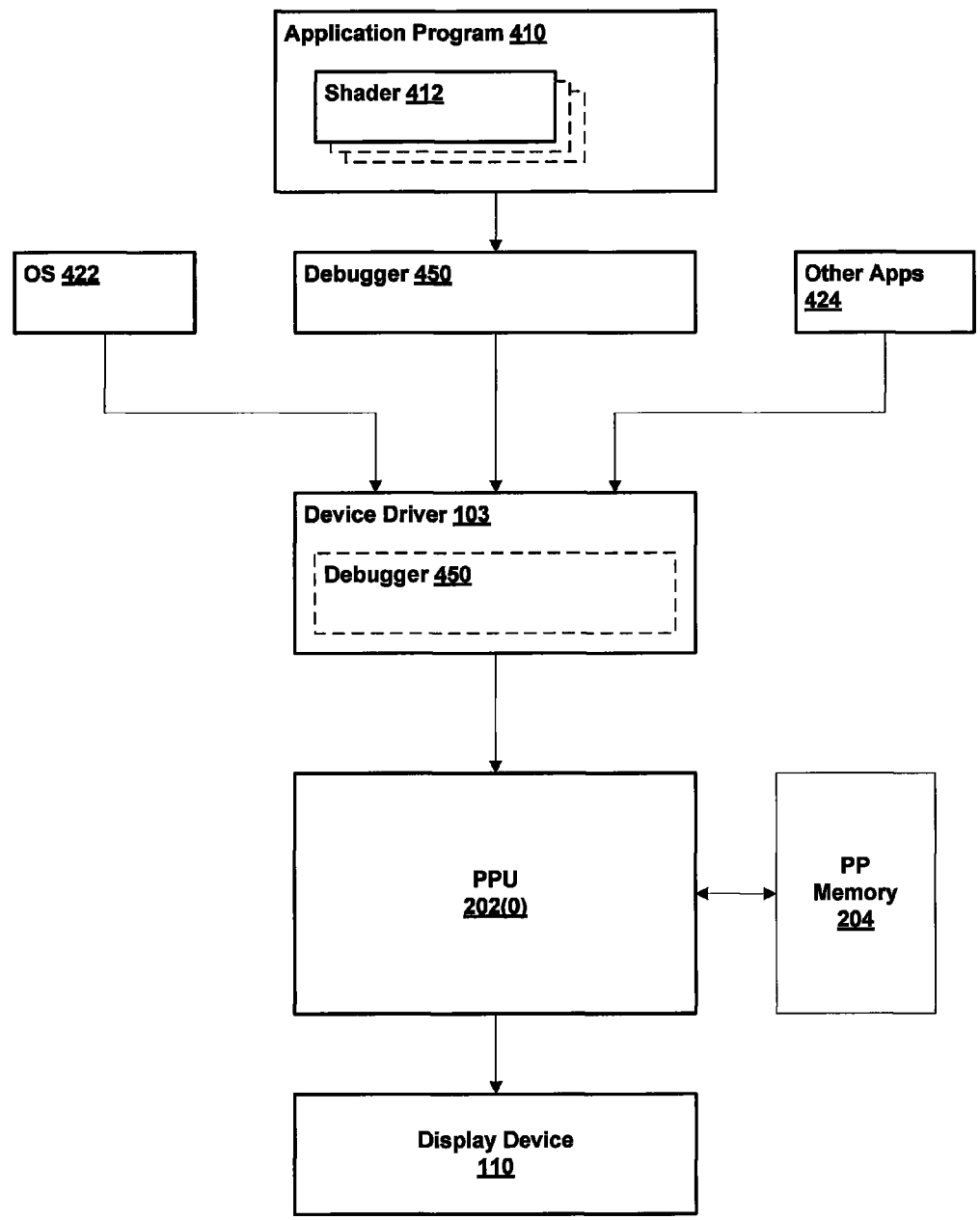
FIG. 4 is a conceptual diagram of a system configured to debug graphics shaders on a graphics processing unit, according to one example embodiment of the present disclosure.

FIG. 4 is a conceptual diagram of a system configured to debug graphics shaders on a graphics processing unit, according to one example embodiment of the present disclosure. As shown in FIG. 4, a software client (i.e., debugger 450) is implemented on system 100 that enables interactive hardware debugging on a non-preemptible GPU, such as PPU 202. The debugger 450 may be a standalone application configured to communicate with PPU 202 via an application programming interface implemented by the device driver 103. The debugger 450 may be stored and executed from system memory 104. In one embodiment, PPU 202 includes some hardware debugging capabilities such as sending notifications to the device driver 103 of hardware traps (e.g., breakpoints, exceptions, assertions, etc.) that occur during run-time, enabling the debugger 450 to perform some debugging related tasks such as flushing portions of PP memory 204 to system memory 104 or allowing device driver 103 to write to register's in the PPU 202. Typically, PPU 202 is a multi-threaded processing unit that allows context switching between two or more applications. In some embodiments, debugger 450 may be implemented directly within device driver 103 and coupled to a graphical user interface implemented by an associated software client outside of device driver 103 to allow a programmer to view processor state, values stored in memory, and select application program 410 and/or shader code 412 for debugging.

In one embodiment, debugger 450 selects application program 410 and/or shader code 412 that a programmer wants to debug based on user input. Typically, performing a hardware debug on a target platform (i.e., PPU 202) requires a remote hardware platform that is separate and distinct from the debugging system. For example, PPU 202(0) is typically configured to perform graphics operations transmitted by an operating system 422 and/or one or more other applications 424 running on CPU 102 in computer system 100 as well as render and display a screen image on display device 110. Hardware debugging typically utilizes stop events such as breakpoints set in the source code for application program 410 and/or shader programs 412 that allows the programmer to execute code up to a particular instruction so that the programmer may examine intermediate values stored in memory to ensure proper operation of the programs. Other stop events may be caused by failed software assertions or illegal instructions that cause an exception. Attempting to debug the shader programs 412 using PPU 202(0) may cause PPU 202(0) to halt execution of all incoming operations from the application program 410 as well as any other operations transmitted by, for example, the operating system 422 or the one or more other applications 424. Halting all graphics operations may prevent any additional updates to a frame buffer stored in PP memory 204 and used to update the image shown on the screen on display device 110, thereby killing screen refresh. Killing the screen refresh capability of PPU 202(0) prevents the programmer from examining any of the intermediate data on display device 110 or even sending a resume command to continue executing the program if the resume command is tied to a graphical user interface of the debugger 450.

A conventional solution to this problem was to connect the debugger 450 to a second PPU 202(1) to be used as the target platform for hardware debugging, while continuing to update display device 110 via a first PPU 202(0). The second PPU 202(1) could be connected to the computer system 100 directly through communications path 113 (in a shared bus configuration) or a second similar communications path. Alternately, the second PPU 202(1) could be connected to the computer system 100 indirectly via network adapter 118 and accessed over a network.

The limitations of such conventional debugging systems are obvious. The required additional hardware increases the debugging platform cost as each debugging platform requires, at a minimum, two CPUs. In addition, managing multiple channels for graphics commands between two different graphics platforms increases the complexity of the system. Consequently, a better solution would be to utilize a single PPU 202 for both screen refresh and debugging, which enables virtually any computer with a graphics card to perform hardware debugging operations.

In contrast to conventional debugging systems, FIG. 4 illustrates a debugging system in which PPU 202 is a single non-preemptible GPU that may be used for both screen updates and hardware debugging. In one embodiment, PPU 202 may be context switched between applications. Typically, once a workload is launched on the PPU 202(0), the workload may need to be completed or flushed before PPU 202 may be switched to a different context. In normal operation, operating system 422 or the other applications 424 may send graphics commands to the device driver 103, which compiles those commands into machine instructions and transmits the machine instructions to the PPU 202 for execution. However, during debugging, the machine instructions transmitted to the PPU 202 via program application 410 may result in the PPU 202 being halted due to the occurrence of a hardware trap, such as a breakpoint or an exception, which could prevent any further graphics commands from being executed by the PPU 202. Thus, PPU 202 must inform the debugger 450 that a hardware trap has occurred (through device driver 103), and then the debugger 450 may handle the hardware trap by performing any operations necessary to save thread state and memory values of currently executing threads, kill (i.e., terminate) the execution of any currently stalled threads (as well as any dependent child threads), and enable additional graphics commands transmitted by the operating system 422 and the other applications 424 to be executed by PPU 202. Consequently, debugger 450 enables PPU 202 to continue updating the screen image displayed on display device 110.

Typically, a workload is executed by PPU 202 in a relatively short time period. For example, workloads may consist of a graphics draw call that renders a frame to be displayed on the screen. Because the frame rate of an application will typically be in the range of 30 frames per second, the graphics draw call will typically execute in less than 30 milliseconds. Similarly, compute workloads (such as physics computations) will also be executed in similar timeframes. Thus, even though submitting a workload for debugging purposes may prevent screen updates for a short time, the PPU 202 will typically finish executing the workload (or the debugger will interrupt the workload, save thread state, and kill the threads associated with the workload) in a fast enough time such that the PPU 202 can be made available to process graphics workloads necessary for performing screen updates.

In one embodiment, a programmer may select an application program 410 containing shader programs 412 to debug using PPU 202. The source code for the application program 410 may be written in C++ or C# or some other high level programming language that, when compiled into a binary executable such as application program 410, may be executed by CPU 102. The source code may include graphics commands structured as API calls to a graphics API such as OpenGL or DirectX that is implemented by the device driver 103. The source code may also incorporate API calls for loading certain shader programs 412 (i.e. graphics programs configured specifically to be executed by a GPU) on PPU 202 for processing workloads created by the application program 410. The source code for the shader programs 412 may be written in a high level shader language such as Cg or the OpenGL Shading Language (GLSL). The shader programs 412 are binary executables that are configured to run on each of the SMs 310 of PPU 202. Debugger 450 is configured to enable a programmer to debug one or more shader programs 412 on the hardware platform of PPU 202.

In another embodiment, debugger 450 may be configured to enable a programmer to debug shader programs 412 directly on PPU 202 without executing application program 410 on CPU 102. For example, debugger 450 may be configured to issue API calls to device driver 103 that load a shader program 412 directly onto PPU 202. Once the shader program 412 is loaded onto PPU 202, the debugger 450 may be configured to create a test workload for processing by the shader program 412 selected to be debugged. It will be appreciated that workloads may need to be predefined by a programmer to provide a known input to the shader program 412 in order to evaluate whether the shader program 412 produces a correct output. Typically, early stages of debugging may consist of low level evaluation of each shader program 412 whereas late stages of debugging may incorporate the interaction of the main application program 410 executed by CPU 102 with the shader programs 412 executed on PPU 202.

Figure 5:
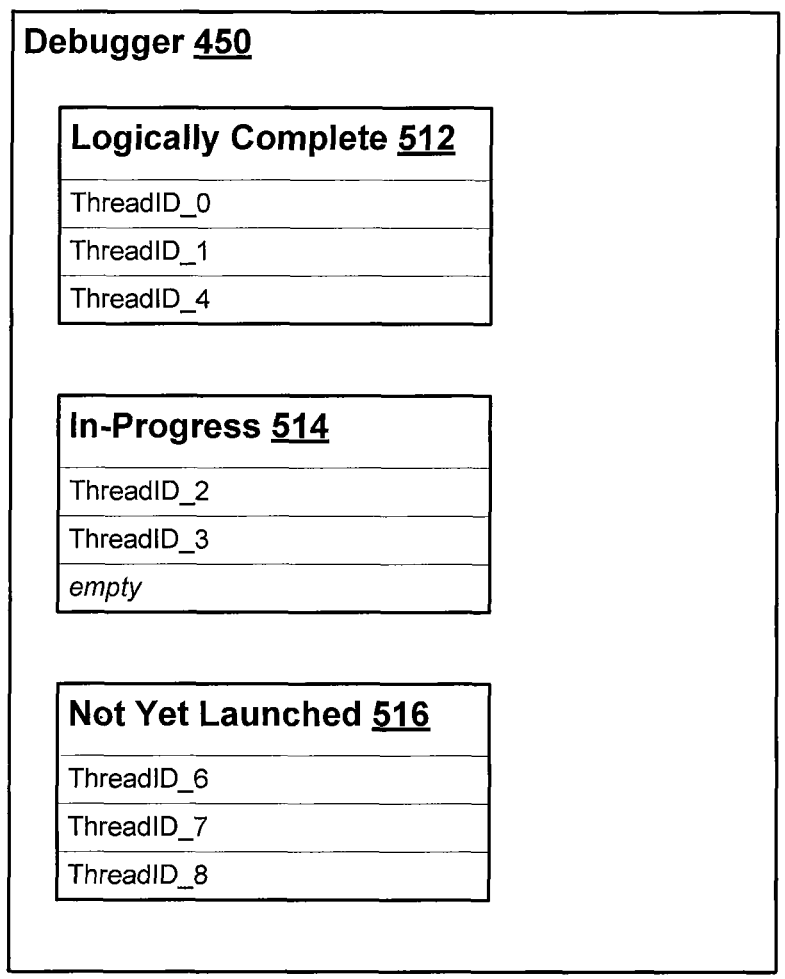
FIG. 5 illustrates data structures maintained by debugger to implement interactive debugging on the graphics processing unit, according to one example embodiment of the present disclosure.

FIG. 5 illustrates data structures maintained by debugger 450 to implement interactive debugging on PPU 202, according to one example embodiment of the present disclosure. As shown in FIG. 5, debugger 450 maintains lists associated with workloads issued to the PPU 202 during debugging. A "workload" is a set of data to be processed by the GPU. For graphics applications, a workload is created by a Draw call (i.e., the API method call that kicks off processing of one or more primitives, such as triangles). For compute applications, a workload is created by a Kernel launch (i.e., the API method call that kicks of processing of TMDs 322).

Upon executing the application program 410 using the debugger 450, the debugger 450 may intercept workloads generated by application program 410 and transmitted to PPU 202 for execution. In one embodiment, the application program 410 executes on CPU 102 and may be configured to create workloads for PPU 202 such as, for example, by generating TMDs 322 in PP memory 204 and issuing a Kernel launch command to device driver 103 that specifies one or more TMDs 322. In one embodiment, debugger 450 is configured to intercept the creation of workloads by CPU 102, generate lists to track the threads launched to process the workloads, issue new workloads generated by the debugger 450, and flush workloads transmitted to PPU 202 to ensure that the additional workloads submitted by other applications will be processed.

In one embodiment, when debugger 450 intercepts a workload transmitted to PPU 202 (via device driver 103) the debugger 450 generates and maintains lists of threads associated with the workload. A first list 512 tracks "logically-complete" threads that stores thread identifiers (ThreadID_x) for each thread associated with the workload that has completed execution. A second list 514 tracks "in-progress" threads that stores thread identifiers for each thread associated with the workload that is currently executing. A third list 516 tracks "not-yet-launched" threads that stores thread identifiers for each thread associated with the workload that has yet to begin execution. Initially, the third list 516 may be populated with the thread identifiers for each thread that is scheduled to be launched to process the intercepted workload, while the first list 512 and the second list 514 are empty. Once the debugger 450 has generated the lists, the debugger 450 issues the workload to the device driver 103 to be executed by PPU 202 and enters a re-launch loop.

The re-launch loop is an iterative loop for emulating hardware debugging that makes it appear that PPU 202 is stepping through a shader program 412 by a small portion of instructions at a time while, in actuality, each step of the program is accomplished by re-issuing the original workload on the PPU 202 and halting execution at different points in the process based on where breakpoints are encountered. Processing the workload is performed by restoring the state of all in-progress threads that were saved during the previous pass so that already completed threads and portions of threads in-progress are not re-executed. Instead, any thread that had already completed will be terminated when the PPU 202 attempts to re-launch the thread, and any thread that was being executed during the previous pass will be restored to the point in the thread at which execution was halted.

In one embodiment, the workload may be associated with a TMD 322 created in PP memory 204 that specifies a plurality of threads to execute for the workload. For example, the TMD 322 may include pointers to a grid (i.e., a collection of CTAs) in up to three dimensions. The grid may include an x-dimension of size 10 CTAs, a y-dimension of size 10 CTAs, and a z-dimension of size 5 CTAs for a total of 500 CTAs included in a workload. As a workload is executed, CTAs from the grid may be issued to one or more SMs 310 of PPU 202. Each thread in a CTA is an instance of a particular shader program 412 specified by the application program 410. In some embodiments, PPU 202 may implement a feature that allows debugger 450 to specify a start index for each of the dimensions of a CTA grid. Thus, if debugger 450 has determined that the CTAs in the first 4 slots in the x-dimension have already finished executing during a previous execution cycle (i.e., pass), then, debugger 450 may specify that PPU 202 should begin execution at the $5^{th}$ CTA in the x-dimension.

As shown in FIG. 5, as the PPU 202 executes the workload, threads are scheduled on an SM 310 for execution. As threads are run by a particular SM 310, some threads may complete execution. Debugger 450 is configured to track which threads (as specified by thread ID) have been scheduled for execution on PPU 202 and moves these thread IDs from the third list 516 (i.e., "not yet launched") to the second list 514 (i.e., "in-progress"). As threads complete execution, debugger 450 moves the thread IDs from the second list 514 to the first list 512 (i.e., "logically complete"). It will be appreciated that, in alternative embodiments, debugger 450 may track threads in other technically feasible ways, such as tracking threads with a single list and associating the thread IDs in the single list with a marker indicating the status of that particular thread (e.g., "not yet launched", "in-progress", or "logically complete"). For example, debugger 450 may assume, by default, that all threads have an inherent status of "not yet launched". As PPU 202 launches threads on SMs 310 during processing of a workload, debugger 450 may add the corresponding thread IDs for the launched threads to an array (i.e., a list). As threads complete execution, the thread IDs may be associated with a marker that indicates that the thread associated with that thread ID is "logically complete". Thus, all threads included in the array are "in progress" unless associated with the marker that indicates that they are "logically complete". If a thread ID for a particular thread is not included in the array, then debugger 450 assumes that the thread corresponding to that thread ID was "not yet launched". In yet other embodiments, debugger 450 may utilize two separate arrays (i.e., lists), one list to indicate that a thread is "in-progress" and another list to indicate that the thread is "logically complete". When a thread finishes execution, debugger 450 may remove the thread ID from the first array and add the thread ID to the second array. Thus, a thread will be considered "in-progress" if the thread ID is included in the first array, "logically complete" if the thread ID is included in the second array, and "not yet launched" if the thread ID is not included in either the first or second array.

At some point, PPU 202 may encounter a hardware trap that halts execution of all threads running on the SMs 310. At this point, PPU 202 notifies device driver 103 that PPU 202 has halted execution and is stalled due to the occurrence of the hardware trap. In one embodiment, device driver 103, in turn, notifies debugger 450 of the hardware stop event. In another embodiment, debugger 450 may poll device driver 103 or PPU 202 to determine whether a hardware trap has occurred. When debugger 450 is notified of the hardware stop event, debugger 450 saves the thread state for each thread included in the second list 514. In other words, for any threads currently "in-progress", debugger 450 saves any thread state information necessary to restore these threads to the current point of execution. For example, debugger 450 may save values stored in special registers, per-thread local memory, and shared global memory to system memory 104. Then, debugger 450 may change the global state of PPU 202 to kill (i.e., terminate) any newly created threads as well as any threads that are currently executing. For example, debugger 450 may set a special register that causes PPU 202 to kill any active threads when execution resumes. Debugger 450 then resumes execution of PPU 202, which kills off all threads associated with the current workload such that PPU 202 can begin processing new workloads. The new workloads may include graphics commands transmitted to PPU 202 by the operating system 422 or the other applications 424 that cause the image on display device 110 to be updated.

Once the PPU 202 has been returned to normal operation by the debugger 450, the GUI for debugger 450 may be updated such that the programmer can inspect any of the saved processing state or variable data associated with the "stalled" shader program 412. The debugger 450 then waits for a resume command to be issued by the programmer. For example, the programmer may set a new breakpoint and select a button to resume execution of the shader program 412. When the debugger 450 receives the resume command, the debugger 450 re-issues the previous workload to the PPU 202. The workload will be restored to the point of execution where the previous hardware trap occurred and allowed to execute until the next stop event caused by a hardware trap, such as reaching a new breakpoint set by the programmer or failing a software assertion in the shader program 412. Once again, the debugger 450 will save the processor state, flush memory from PP memory 204, kill any active threads associated with the workload, and return PPU 202 to normal operation. By looping through this re-launch process, debugger 450 may iteratively enable a programmer to step through a shader program 412 for debugging purposes while preventing the hardware stop events from causing display device 110 to stop being updated.

In one embodiment, debugger 450 causes PPU 202 to execute a thread-entry routine prior to running any instructions for a particular thread. The thread-entry routine is a set of instructions that determine whether a thread should be executed based on the lists (e.g., 512, 514, 516) maintained by debugger 450. For example, when a thread is launched, the thread-entry routine checks whether that thread is included in the first list 512 (i.e., "logically complete") as having already been completely executed. If the thread ID is included in the first list 512, then the thread-entry routine kills the thread such that the SM 310 may execute another thread instead. In other words, that particular thread specified by the workload was already executed during a previous re-launch loop and the output of that thread has been incorporated into the stored frame buffer or processor state. Therefore, that thread does not need to be executed during the current re-launch pass. However, if the thread ID is not included in the first list 512, then the thread-entry routine determines whether the thread ID is included in the second list 514 (i.e., "in-progress"), thereby, requiring some amount of state or memory stored during the previous re-launch pass to be restored on PPU 202 or in PP memory 204. If the thread ID is included in the second list 514, then the thread-entry routine restores the thread state for that thread and allows the thread to continue executing from the point where the thread was killed during the last re-launch pass. If the thread ID is not included in either the first list 512 or the second list 514, then the thread should be included in the third list 516 (i.e., "not yet launched"), and the thread-entry routine will launch execution of that thread on one of the SMs 310 of PPU 202.

In other embodiments, some resources of PPU 202 may not be re-storable. For example, some hardware registers may be read-only (e.g., hardware thread ID or other state may be stored in special registers) and, therefore, debugger 450 may not be able to restore these state variables during subsequent passes of the workload on PPU 202. For example, PPU 202 may not enable debugger to specify on which particular SM 310 of PPU 202 a particular thread is launched. Because some shader programs 412 may include instructions that use these special registers as input for calculating some intermediate address or data, these shader programs 412 may not function correctly if, on a subsequent pass, thread state corresponding to one SM 310 is restored to a thread that is now executing on a different SM 310. One solution to this problem is to virtualize these resources using thread-local memory in PP memory 204 and to then change the instructions in the threads to use these virtual locations for any calculations rather than the special read-only registers or other non-restorable resources. Another possible solution to this problem would be to limit parallelism of the PPU 202 such that threads may only execute on a single SM 310 of PPU 202, thereby ensuring that the indexes stored by these registers are always the same because the threads will always be launched at the same hardware location. However, this solution has the drawback that CTA execution is serialized, thereby hiding any errors caused by the parallel nature of the shader execution, such as race conditions and other synchronization issues.

In some embodiments, PPU 202 may include a feature that allows a programmer to set a timeout limit that automatically interrupts any program (i.e., workload) being executed by the PPU 202 if the workload has not been fully processed by the expiration of the timeout limit. This interruption constitutes the completion of a re-launch pass. In other words, the timeout limit prevents the PPU 202 from crashing in the event of a software bug in the shader program 412 that causes PPU 202 to hang. One advantage of the currently disclosed technique over conventional debugging techniques is that conventional techniques typically required the timeout protection of a PPU 202 to be disabled because, while the hardware is halted, the operating system considers the workload to be active. The time the user spends inspecting state while at a breakpoint counts against the timeout limit. In the disclosed technique however, timeout protection doesn't need to be disabled but may remain enabled during each pass of the workload (although the timeout limit may need to be increased to encompass delays caused by the hardware trap and state saving functions performed by the CPU before resume) while allowing the user to inspect state in the debugger for an unbounded duration of time.

In some embodiments, debugger 450 may be configured to only allow "in-progress" threads to be restored during subsequent re-launch passes. In other words, debugger 450 may be configured to issue a workload to PPU 202 and wait for a hardware trap to occur that stalls processing of the workload. At this point in the processing of a thread, debugger 450 has generated a list of threads that are "in-progress" as well as a list of threads that are "logically complete". In these embodiments, during subsequent passes, debugger 450 may be configured to kill any thread that PPU 202 attempts to launch that is associated with a thread ID in either the "logically complete" state or the "not yet launched" state. This configuration may prevent "not yet launched" threads from being launched prior to threads that were previously "in-progress", which if not prevented could cause a subsequent hardware trap to occur in a completely unrelated section of code, diverting the programmer's attention from the location in the code that caused the previous hardware trap. Thus, the size of the "in-progress" list cannot grow unbounded during each subsequent pass. A disadvantage to this technique, however, is that deadlocks may occur where the "in-progress" thread is stalled waiting for a related thread to execute, when the related thread is "not yet launched".

Figure 6:
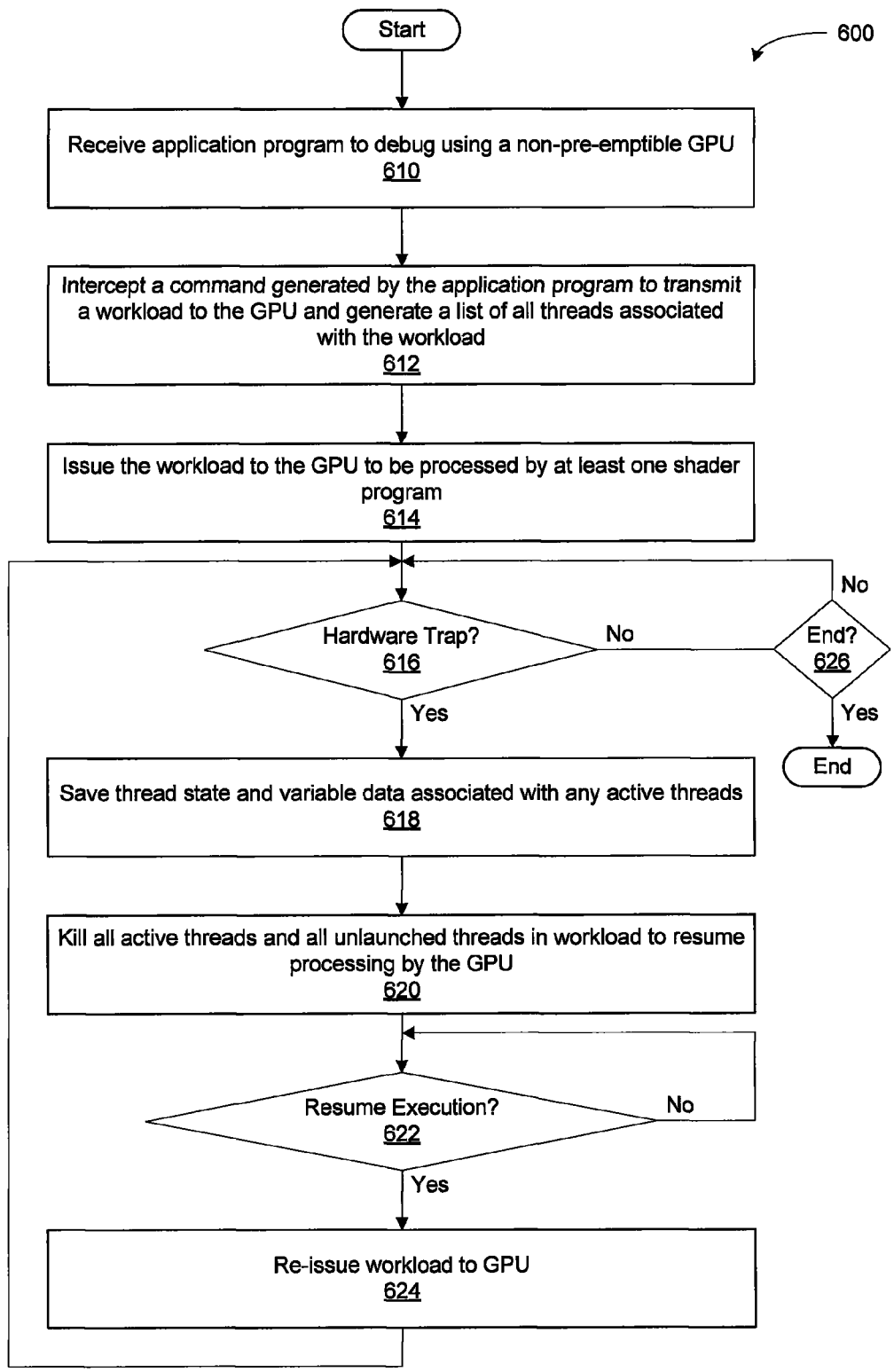
FIG. 6 illustrates a method for performing interactive debugging on a non-preemptible graphics processing unit, according to one example embodiment of the present disclosure.

FIG. 6 illustrates a method 600 for performing interactive debugging on a non-preemptible GPU, according to one example embodiment of the present disclosure. Although the method steps are described in conjunction with the systems of FIGS. 1-5, persons of ordinary skill in the art will understand that any system configured to perform the method steps, in any order, is within the scope of the disclosure.

Method 600 begins at step 610, where debugger 450 receives application program 410 and shader programs 412 to debug using a non-preemptible GPU such as PPU 202. The PPU 202 may be the only graphics processor included in the debugging platform and may be used for both debugging purposes as well as screen updates. In one embodiment, application program 410 is written in a high level programming language such as C++ while shader programs are written in a high level shading language such as Cg. At step 612, the debugger 450 intercepts a command generated by the application program 410 to transmit a workload to the PPU 202. The debugger 450 generates a list to track the threads associated with the workload. At step 614, debugger 450 issues the workload to the PPU 202, which causes at least one shader program 412 to be loaded onto PPU 202 to process the workload. In one embodiment, debugger 450 may be able to load a shader program 412 directly onto PPU 202 and issue a pre-defined workload directly to shader program 412 without executing the source program 410 on CPU 102.

At step 616, debugger 450 determines whether a hardware trap has occurred. In one embodiment, device driver 103 is informed whenever a hardware trap has occurred by PPU 202 and is configured to notify debugger 450 when the hardware trap has occurred. In another embodiment, debugger 450 polls device driver 103 to determine the state of PPU 202. If debugger 450 determines that a hardware trap has not occurred, then method 600 proceeds to step 626 where debugger 450 determines whether the workload has finished processing. At step 626, if the workload has finished processing then method 600 terminates. However, if the workload is still being processed, then method 600 returns to step 616 where debugger 450 waits until a hardware trap occurs and then method 600 proceeds to step 618. At step 618, debugger 450 saves thread state and variable data associated with any active threads processing the workload. In one embodiment, debugger 450 copies register values from PPU 202 as well as copying per-thread local memory from PP memory 204 to system memory 104. Debugger 450 may also copy shared memory from PP memory 204 to system memory 104. At step 620, debugger 450 updates the processor state of PPU 202 such that when PPU 202 resumes operation, all currently active threads and newly created threads associated with the current workload will be killed. Then debugger 202 causes PPU 202 to resume operation, which eventually results in all threads generated by the workload to be killed and frees PPU 202 to process additional workloads.

At step 622, debugger 450 determines whether the programmer wishes to resume debugging the shader program 412 using the current workload. For example, the GUI for debugger 450 may include a step command that indicates the shader program 412 should execute the next instruction, or the GUI for debugger 450 may include a resume command that indicates that the shader program 412 should continue execution until the next hardware stop event (i.e., a breakpoint, exception, or a failed assertion, etc.). If debugger 450 determines that the programmer has not issued a command to resume execution, then debugger 450 waits, allowing PPU 202 to continue processing graphics workloads from other applications that result in updated images being displayed on display device 110. However, if debugger 450 determines that the programmer has issued a resume command, then method 600 proceeds to step 624, where debugger 450 re-issues the workload to the PPU 202. In one embodiment, debugger 450 tracks the state of threads generated to process the workload. If a thread has already completed executing during a previous issuing of the workload, then the thread may be killed and skipped, or if they thread has not been issued, then the thread may be executed from the beginning of the thread. However, if the thread was previously partially executed (i.e., "in-progress"), then the debugger 450 may restore the thread state and execute the thread from a point corresponding to the previously interrupted point of the thread. Method 600 returns to step 616 and waits for either the workload to finish being processed or the next hardware trap.

In sum, a parallel processing unit is configured to perform hardware debugging of shader programs while substantially simultaneously generating and updating images displayed on a display device that enable a GUI for a development environment to be viewed by a programmer. The iterative, partial processing of a workload via the parallel processing unit allows the debugger to appear to stall the parallel processing unit between breakpoints while actually interrupting processing of the workload to enable graphics updates to be processed by the parallel processing unit. In other words, a debugger saves processor state and memory to enable the parallel processing unit to switch contexts even though the hardware does not support context switching while execution of a workload is stalled due to a hardware trap.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

What is claimed is:

1. A method for performing interactive debugging on non-preemptible graphics processing units, the method comprising:
    allowing a shader program to be loaded onto a parallel processing unit by an application program, wherein the parallel processing unit is configured to render a graphical user interface for an interactive debugging environment for display on a display device coupled to the parallel processing unit;
    intercepting a command to transmit a workload to the parallel processing unit;
    issuing the workload to the parallel processing unit for processing during a first processing pass, wherein the workload is processed by a plurality of threads executing in parallel on separate input data included in the workload, and wherein the parallel processing unit is configured to halt the first processing pass when a hardware trap is triggered by any thread in the plurality of threads;
    detecting that a hardware trap has occurred during a first point in the first processing pass; and
    entering a re-launch loop that comprises disabling the first processing pass to allow the graphical user interface to be updated by the parallel processing unit and re-issuing the workload to the parallel processing unit for processing during one or more subsequent processing passes.

2. The method of claim 1, wherein a hardware trap is triggered by at least one of a breakpoint, a hardware exception, or a failed software assertion.

3. The method of claim 1, wherein the re-launch loop comprises:
    storing state associated with each thread being executed by the parallel processing unit at the first point in a system memory;
    terminating all threads being executed by the parallel processing unit such that the parallel processing unit is able to process any additional workloads transmitted to the parallel processing unit for updating the display device; and
    re-issuing the workload to be processed by the parallel processing unit during a subsequent processing pass, wherein state associated with any thread launched during the subsequent pass that was being executed by the parallel processing unit at the first point during the first processing pass is restored to the parallel processing unit and execution of said threads is resumed from instructions in the threads at which execution was halted during the first processing pass.

4. The method of claim 3, wherein the re-launch loop further comprises:
   storing per-thread local memory associated with each thread being executed by the parallel processing unit at the first point in a system memory, wherein per-thread local memory associated with any thread launched during the subsequent processing pass that was being executed by the parallel processing unit at the first point during the first processing pass is restored to a parallel processing memory coupled to the parallel processing unit;
   storing per-thread registers associated with each thread being executed by the parallel processing unit; and
   storing shared memory associated with the plurality of threads in the system memory, wherein shared memory is restored to the parallel processing memory during the subsequent processing pass.

5. The method of claim 3, further comprising tracking the state of each of the plurality of threads launched by the parallel processing unit to process the workload during either the first processing pass or any subsequent processing pass.

6. The method of claim 5, wherein the state of a particular thread comprises an indication as to whether the particular thread has not yet been launched, is being executed, or has logically completed execution while processing the workload during the first processing pass or any subsequent processing pass.

7. The method of claim 6, further comprising causing a thread-entry routine to be executed when a new thread is launched by the parallel processing unit, wherein the thread-entry routine is configured to:
   terminate the new thread if the new thread is associated with a thread state that indicates the new thread has logically completed execution during a previous processing pass;
   restore the state and per-thread local memory associated with the new thread and resume execution of the new thread from an intermediate instruction of the shader program if the new thread is associated with a thread state that indicates the new thread was being executed during the previous processing pass; and
   execute the new thread from a first instruction of the shader program if the new thread is associated with a thread state that indicates the new thread has not yet been launched during the previous processing pass.

8. The method of claim 6, wherein re-issuing the workload to be processed by the parallel processing unit during a subsequent processing pass comprises preventing any threads having a state that indicates the particular thread has not yet been launched from being launched during the subsequent processing pass such that only threads having a state that indicates the particular thread was being executed at the first point during the first processing pass is allowed to continue execution during the subsequent processing pass.

9. A non-transitory computer-readable storage medium storing a debugger that, when executed by a processing unit, causes the processing unit to perform the steps of:
   allowing a shader program to be loaded onto a parallel processing unit by an application program, wherein the parallel processing unit is configured to render a graphical user interface for an interactive debugging environment for display on a display device coupled to the parallel processing unit;
   intercepting a command to transmit a workload to the parallel processing unit;
   issuing the workload to the parallel processing unit for processing during a first processing pass, wherein the workload is processed by a plurality of threads executing in parallel on separate input data included in the workload, and wherein the parallel processing unit is configured to halt the first processing pass when a hardware trap is triggered by any thread in the plurality of threads;
   detecting that a hardware trap has occurred during a first point in the first processing pass; and
   entering a re-launch loop that comprises disabling the first processing pass to allow the graphical user interface to be updated by the parallel processing unit and re-issuing the workload to the parallel processing unit for processing during one or more subsequent processing passes.

10. The non-transitory computer-readable storage medium of claim 9, wherein the re-launch loop comprises:
   storing state associated with each thread being executed by the parallel processing unit at the first point in a system memory;
   terminating all threads being executed by the parallel processing unit such that the parallel processing unit is able to process any additional workloads transmitted to the parallel processing unit for updating the display device; and
   re-issuing the workload to be processed by the parallel processing unit during a subsequent processing pass, wherein state associated with any thread launched during the subsequent pass that was being executed by the parallel processing unit at the first point during the first processing pass is restored to the parallel processing unit and execution of said threads is resumed from instructions in the threads at which execution was halted during the first processing pass.

11. The non-transitory computer-readable storage medium of claim 10, wherein the re-launch loop further comprises:
   storing per-thread local memory associated with each thread being executed by the parallel processing unit at the first point in a system memory, wherein per-thread local memory associated with any thread launched during the subsequent processing pass that was being executed by the parallel processing unit at the first point during the first processing pass is restored to a parallel processing memory coupled to the parallel processing unit;
   storing per-thread registers associated with each thread being executed by the parallel processing unit; and
   storing shared memory associated with the plurality of threads in the system memory, wherein shared memory is restored to the parallel processing memory during the subsequent processing pass.

12. The non-transitory computer-readable storage medium of claim 10, further comprising tracking the state of each of the plurality of threads launched by the parallel processing unit to process the workload during either the first processing pass or any subsequent processing pass.

13. The non-transitory computer-readable storage medium of claim 12, wherein the state of a particular thread comprises an indication as to whether the particular thread has not yet been launched, is being executed, or has logically completed execution while processing the workload during the first processing pass or any subsequent processing pass.

14. The non-transitory computer-readable storage medium of claim 13, further comprising causing a thread-entry routine to be executed when a new thread is launched by the parallel processing unit, wherein the thread-entry routine is configured to:

terminate the new thread if the new thread is associated with a thread state that indicates the new thread has logically completed execution during a previous processing pass;

restore the state and per-thread local memory associated with the new thread and resume execution of the new thread from an intermediate instruction of the shader program if the new thread is associated with a thread state that indicates the new thread was being executed during the previous processing pass; and execute the new thread from a first instruction of the shader program if the new thread is associated with a thread state that indicates the new thread has not yet been launched during the previous processing pass.

15. The non-transitory computer-readable storage medium of claim 13, wherein re-issuing the workload to be processed by the parallel processing unit during a subsequent processing pass comprises preventing any threads having a state that indicates the particular thread has not yet been launched from being launched during the subsequent processing pass such that only threads having a state that indicates the particular thread was being executed at the first point during the first processing pass is allowed to continue execution during the subsequent processing pass.

16. A system for performing interactive debugging on non-preemptible graphics processing units, the system comprising:

a system memory including a debugger and an application program including one or more shader programs targeted for debugging;

a central processing unit (CPU) coupled to the system memory;

a parallel processing unit configured to render a graphical user interface for an interactive debugging environment for display on a display device coupled to the parallel processing unit; and a graphics memory coupled to the parallel processing unit, wherein the debugger, when executed by the CPU, is configured to:

allow the shader program to be loaded onto the parallel processing unit by the application program, intercept a command to transmit a workload to the parallel processing unit;

issue the workload to the parallel processing unit for processing during a first processing pass, wherein the workload is processed by a plurality of threads executing in parallel on separate input data included in the workload, and wherein the parallel processing unit is configured to halt the first processing pass when a hardware trap is triggered by any thread in the plurality of threads, detect that a hardware trap has occurred during a first point in the first processing pass, and enter a re-launch loop that comprises disabling the first processing pass to allow the graphical user interface to be updated by the parallel processing unit and re-issuing the workload to the parallel processing unit for processing during one or more subsequent processing passes.

17. The system of claim 16, wherein the re-launch loop comprises:

storing state associated with each thread being executed by the parallel processing unit at the first point in a system memory;

terminating all threads being executed by the parallel processing unit such that the parallel processing unit is able to process any additional workloads transmitted to the parallel processing unit for updating the display device; and re-issuing the workload to be processed by the parallel processing unit during a subsequent processing pass, wherein state associated with any thread launched during the subsequent pass that was being executed by the parallel processing unit at the first point during the first processing pass is restored to the parallel processing unit and execution of said threads is resumed from instructions in the threads at which execution was halted during the first processing pass.

18. The system of claim 17, the debugger further configured to track the state of each of the plurality of threads launched by the parallel processing unit to process the workload during either the first processing pass or any subsequent processing pass.

19. The system of claim 18, wherein the state of a particular thread comprises an indication as to whether the particular thread has not yet been launched, is being executed, or has logically completed execution while processing the workload during the first processing pass or any subsequent processing pass.

20. The system of claim 19, the debugger further configured to cause a thread-entry routine to be executed when a new thread is launched by the parallel processing unit, wherein the thread-entry routine is configured to:

terminate the new thread if the new thread is associated with a thread state that indicates the new thread has logically completed execution during a previous processing pass;

restore the state and per-thread local memory associated with the new thread and resume execution of the new thread from an intermediate instruction of the shader program if the new thread is associated with a thread state that indicates the new thread was being executed during the previous processing pass; and execute the new thread from a first instruction of the shader program if the new thread is associated with a thread state that indicates the new thread has not yet been launched during the previous processing pass.

* * * * *